UNITED STATES PATENT OFFICE.

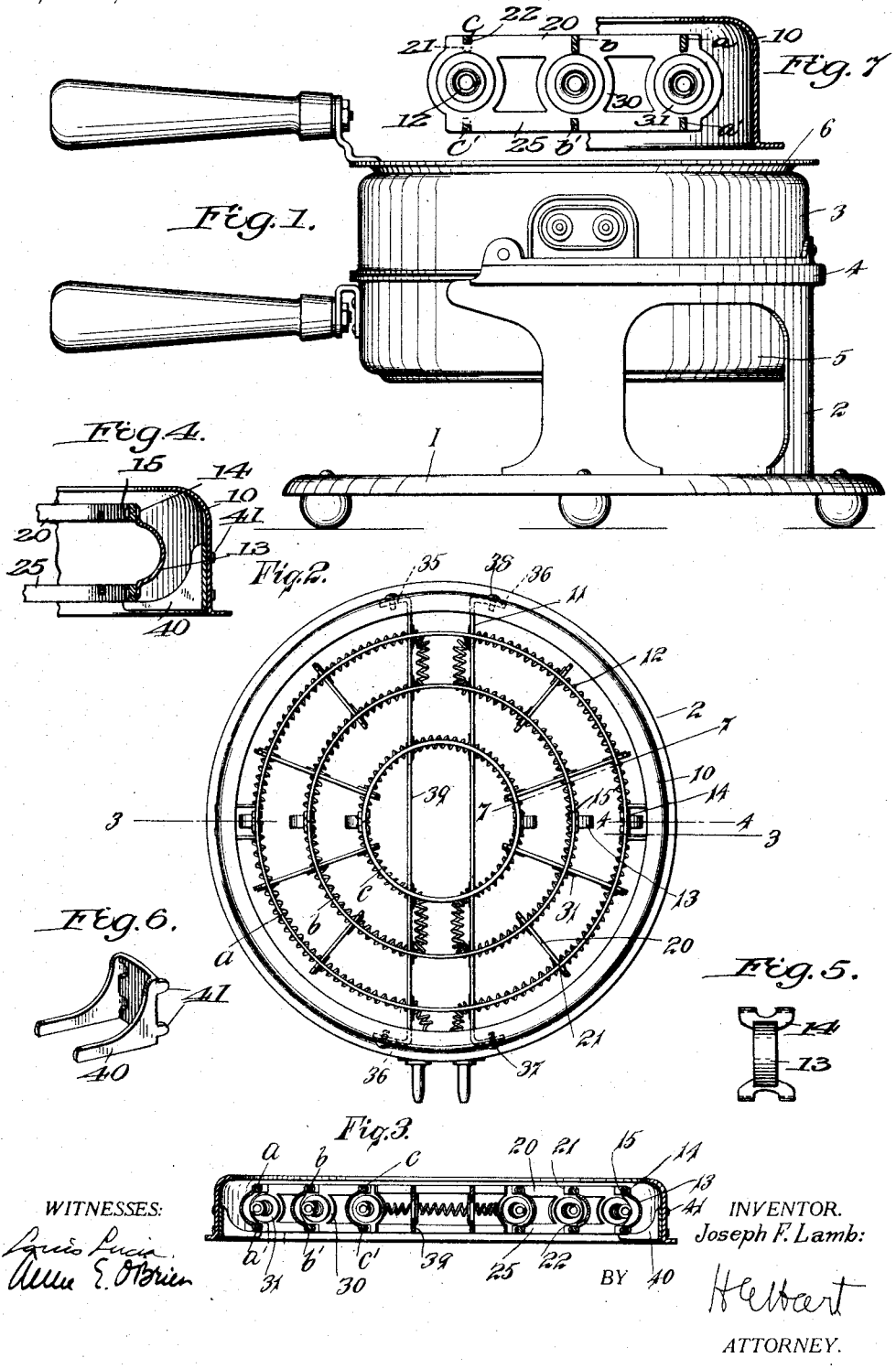

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICAL HEATER.

1,191,601.

Specification of Letters Patent.

Patented July 18, 1916.

Application filed May 7, 1915. Serial No. 26,495.

*To all whom it may concern:*

Be it known that I, JOSEPH F. LAMB, a citizen of the United States, and a resident of New Britain, in the county of Hartford and State of Connecticut, have invented certain new and useful Improvements in Electrical Heaters, of which the following is a specification.

This invention relates to electrical heaters adapted for various uses, and the embodiment shown is particularly designed for use in what is known in the trade as a grill, supported by uprights on a suitable base, and with provisions for locating receptacles either above or below it to carry on cooking operations. However there are various uses to which a heater embodying the features of invention about to be described may be put, as will be obvious to those who are skilled in the art.

The invention is concerned with a novel construction of a heater frame adapted for various uses, and to the association with such a heater frame of a surrounding or inclosing body or wall. The heater frame is of a skeleton construction, which permits of a free circulation of the heated air so as to secure uniform heating effects, and the inclosing body when used protects the heater from outside currents of cold air which would tend to diminish its efficiency.

In the drawings—Figure 1 is a side view of a grill in which the heater is incorporated. Fig. 2 is a plan view of a heater made in accordance with my invention. Fig. 3 is a transverse sectional view on the line 3—3 of Fig. 2. Fig. 4 is a detail sectional view of a portion of the structure at 4—4 of Fig. 2, showing the tie and auxiliary support. Fig. 5 is a side view of the tie. Fig. 6 is a detail perspective view of the auxiliary support. Fig. 7 is a section view of a portion of the structure on the line 7—7 of Fig. 2.

Referring first to Fig. 1, of the drawings, 1 denotes the base of the complete utensil, 2 the uprights mounted thereon, 3 the heater supported at the top of the uprights, the uprights being fluted as at 4 immediately underneath the heater to provide slideways for the support of a food receptacle 5, and 6 denotes a food receptacle fitted to the top of the heater.

Referring to Figs. 2 to 7, 10 denotes the inclosing body of the heater, and 11 denotes generally the frame mounted within the body and by which the resistor, which as shown is in the form of a coiled wire 12, is supported. The heater frame is composed of upper and lower frame members, each comprising a plurality of metallic rings, $a$, $b$, $c$, $a'$, $b'$, $c'$, the rings of each set being spaced apart by bars 20, 25, the bars and rings being notched as at 21, 22, so that each will interlock with the other and thus provide an interengagement which will prevent relative motion between them. The upper and lower frame members are spaced apart and connected together as by the washers 30, preferably formed integrally with the bars 20, 25, and at points between the corresponding rings $a$, $a'$, $b$, $b'$, $c$, $c'$ of the frame members. Secured to these washers are washers 31 of insulating material through which the resistor passes and by which it is supported and insulated from the bars 20, 25.

The ends of the rings are joined together and the corresponding rings of both frame members are held in proper relation to one another by the ties 13, which may be provided at their ends with projections 14 adapted to pass through apertures in the rings, their ends being bent over as at 15 to hold them in position. This arrangement provides for threading the resistor through the supports, either continuously first through the outer, then through the intermediate, and then through the inner set of supports; or one resistor may be threaded through the outer supports, and a second through the intermediate and inner supports, so as to provide for the making of a variety of connections to produce heats of different intensity.

In order to support the heater within the inclosing body, the outer ends of opposite transverse bars, both upper and lower, are extended and bent at an angle to form the ears 35, 36, which are apertured to fit onto supporting members 37, 38, in the body. The members 37 may be screws, if desired, for securing the ears 35 to the body, but the members 38 are preferably smooth so that the ears can slide back and forth on them as the frame expands and contracts, to prevent buckling. It may be preferable to extend two sets of the transverse bars entirely across the frame, as indicated at 39, in order to increase the stiffness of the structure. I prefer also to provide additional or auxiliary supports at each side of the inclosing body midway between the supporting members 37, 38, in the form of single or double-armed members 40 secured to the inner wall of the inclosing body as by the projections 41, which pass through apertures in the body and are bent over to secure them in place. The frame merely rests on these auxiliary supports and is free to shift its position thereon during expansion or contraction.

While the various parts of the skeleton frame are securely connected together, these connections nevertheless are not of a rigid character, and in connection with the manner of supporting the frame within the inclosing body it is possible for each part to adjust itself slightly relative to the other parts in order to permit the several parts to go and come under the expansion and contraction occasioned by the heating and cooling of the structure in its ordinary use, without subjecting the structure to wracking strains which might have a tendency to break it down. It will also be observed that the entire structure is composed of light metal parts, easily manufactured and assembled and extremely economical, yet providing a satisfactory and efficient insulated support for the resistor and permitting it to be arranged in various ways to provide a variety of heating effects.

The result of this construction as clearly seen in Fig. 2 is the provision of a plurality of converging members comprised of the parts 20, 25 and 30, which are preferably made integral, which members are supported and spaced from one another by the upper and lower frame members $a$, $b$, $c$, $a'$, $b'$, $c'$. In the converging members as shown there is a plurality of sets of alined apertures through which the resistor may be threaded as a continuous member, or it may be broken to form two separate members, one for instance threaded through the outer set of apertures, and the other through the intermediate and inner set in order to provide for two or more heats, depending upon how the connections with the divided resistor are made. The upper and lower frame members, which are shown as being of complete circular form, may be of more or less incomplete circular form, and of other than circular form, for instance, a polygon of a greater or less number of sides. Also, as above pointed out, the resistor can be divided up and be equipped with the proper connection plugs so as to produce a variety of heating effects, and it is also apparent that the number of coils of the resistor may be increased as occasion may demand.

I claim as my invention:

1. In an electrical heating utensil, a body and a resistor-supporting frame mounted therein, said frame comprising upper and lower frame members, each of which consists of a plurality of concentric rings and means for spacing said rings from one another, means for spacing said frame members from one another, and a resistor arranged between, supported by, and insulated from said frame members.

2. In an electrical heating utensil, a body and a resistor-supporting frame mounted therein, said frame comprising upper and lower frame members, each of which consists of a plurality of concentric rings and means for spacing said rings from one another, means for spacing said frame members from one another, and a resistor coiled about said frame between the corresponding rings of the two frame members, supported by and insulated from said frame members.

3. In an electrical heating utensil, a body and a resistor-supporting frame mounted therein, said frame comprising upper and lower frame members, each of which consists of a plurality of concentric rings and bars extending between said rings and interengaged therewith to space them apart, means arranged between corresponding rings of the upper and lower frame members to space and hold the latter apart, and a resistor arranged between corresponding rings of the upper and lower frame members and supported and insulated from said means.

4. In an electrical heating utensil, a body and a resistor-supporting frame mounted therein, said frame comprising upper and lower frame members, each of which consists of a plurality of concentric rings and means for spacing said rings from one another, apertured members located between and connected with said frame members, and a resistor supported by and insulated from said apertured members.

5. In an electrical heating utensil, a body and a resistor supporting frame mounted therein, said frame comprising upper and lower frame members, each of which consists of a plurality of concentric rings and means for spacing said rings from one another, means for spacing said frame members from one another, a resistor arranged between, supported by, and insulated from said frame members, and auxiliary supports secured to the inner side of said body and projecting under said frame.

6. In an electrical heating utensil, a body, bars extending across said body approximately centrally thereof and supported thereby, two sets of concentric rings arranged one set above the other within said body and interengaged with said bars at opposite sides of the center, means for spacing the rings of each set from one another, means for connecting said two sets of rings together, and a resistor arranged between said sets of rings and supported and insulated therefrom.

7. In an electrical heating utensil, a circular body, and a circular heater frame mounted therein, said frame made up of similar upper and lower frame members suitably spaced apart, each member comprising a plurality of concentric rings, means for spacing said rings from one another, and stiffening devices extending entirely across said heater.

8. In an electrical heating utensil, a body, and a resistor-supporting frame mounted therein, said frame comprising upper and lower frame members, each of which consists of a plurality of concentric rings and means for spacing said rings from one another, means for spacing said frame members from one another, means for tying the corresponding rings of each frame member together, and a resistor arranged between, supported by and insulated from said frame members.

9. In an electrical heating utensil, a resistor-supporting frame comprising upper and lower frame members which consist of a plurality of substantially ring-shaped pieces, radial members between said upper and lower frame members and connected to said pieces, insulated supports on said radial members, and a resistor carried by said supports.

10. In an electrical heating utensil, a resistor-supporting frame comprising upper and lower frame members which consist of a plurality of substantially ring-shaped pieces, radial members between said upper and lower frame members and connected to said pieces, insulated supports on said radial members between corresponding ring-shaped pieces of said upper and lower frame members, and a resistor carried by said supports and following the contour of said ring-shaped pieces.

11. In an electrical heating utensil, a resistor-supporting frame comprising upper and lower frame members which consist of a plurality of substantially ring-shaped pieces, radial members between said upper and lower frame members and connected to said pieces, insulated supports on said radial members between corresponding ring-shaped pieces of said upper and lower frame members, a resistor carried by said supports and following the contour of said ring-shaped pieces, and means for securing said upper and lower frame members together to clamp said radial members between said ring-shaped pieces.

12. A resistor-supporting frame for electric heaters comprising a plurality of converging metallic members, means for supporting said converging members, and a resistor carried by and insulated from said converging members.

13. A resistor-supporting frame for electric heaters comprising a plurality of converging metallic members, supporting and spacing means therefor, and a resistor carried by said frame and insulated therefrom.

14. A resistor-supporting frame for electric heaters comprising a plurality of converging metallic members, upper and lower frame members engaged with said converging members and spacing them from one another, and a resistor carried by and insulated from said converging members.

15. A resistor-supporting frame for electric heaters comprising a plurality of converging metallic members provided with alined insulated supports, resistors carried by said supports, and means for supporting said converging members.

16. A resistor-supporting frame for electric heaters comprising a plurality of converging metallic members provided with alined insulated supports, resistors carried by said supports, and means arranged above and below said converging members to support and space them from one another.

17. A resistor-supporting frame for electric heaters comprising a plurality of converging metallic members, ring-like members supporting and spacing said converging members, and a heating resistor carried by and insulated from said converging members.

18. A resistor-supporting frame for electric heaters, comprising a plurality of converging metallic members, ring-like members arranged in pairs above and below said converging members to support and space them from one another, and a heating resistor carried by and insulated from said converging members.

19. A resistor-supporting frame for electrical heaters comprising a plurality of converging members, supports for said members arranged transversely thereof, and a resistor carried by said frame.

20. A resistor-supporting frame comprising a plurality of thin flat converging members, supports arranged above and below said members and engaged with the edges thereof, and a resistor mounted in said frame.

21. A resistor-supporting frame comprising a plurality of longitudinally converging members, means for supporting said members in spaced relation relative to one another, and a resistor mounted in said frame.

JOSEPH F. LAMB.

Witnesses:
P. V. GINBERSON,
C. E. CRANE.